United States Patent [19]
Lee et al.

[11] Patent Number: 5,873,045
[45] Date of Patent: Feb. 16, 1999

[54] MOBILE CLIENT COMPUTER WITH RADIO FREQUENCY TRANSCEIVER

[75] Inventors: Peter Lee, Chapel Hill; Brian Ashley Carpenter, Cary; Mark Garner Noll; Robert E. Reiland, both of Raleigh, all of N.C.

[73] Assignee: International Business Machines Corporation, Armonk, N.Y.

[21] Appl. No.: 959,997

[22] Filed: Oct. 29, 1997

[51] Int. Cl.[6] .................................................... H04Q 7/20
[52] U.S. Cl. .................. 455/550; 455/557; 455/575; 455/558; 455/566
[58] Field of Search .................................. 455/550, 557, 455/566, 575, 90, 556, 558; 364/705.01, 705.05; 439/946, 367, 502; 361/686; 345/179, 173

[56] References Cited

U.S. PATENT DOCUMENTS

| | | | |
|---|---|---|---|
| 5,189,632 | 2/1993 | Paajanen et al. | 364/705.05 |
| 5,263,875 | 11/1993 | Spicer et al. | 361/686 |
| 5,353,334 | 10/1994 | O'Sullivan | 455/557 |
| 5,594,952 | 1/1997 | Vittuoso et al. | 455/557 |
| 5,628,055 | 5/1997 | Stein | 364/705.05 X |
| 5,634,080 | 5/1997 | Kikinis et al. | 455/575 |

*Primary Examiner*—Wellington Chin
*Assistant Examiner*—Yemane Woldetatios
*Attorney, Agent, or Firm*—Bernard D. Bogdon; Daniel E. McConnell

[57] ABSTRACT

A mobile client system in which a tripartite organization is used to facilitate adaptation of the system to alternate or later developed wireless communication technology. In particular, the system of this invention contemplates the provision of an intermediate element, here called a holster, to enable effective cooperation between a computer system and a radio frequency transceiver. The transceiver, as here contemplated, will have additional capability beyond simple data exchange, and preferably will be a telephone or have telephone capability.

21 Claims, 10 Drawing Sheets

FIG. 10

MOBILE CLIENT COMPUTER WITH RADIO FREQUENCY TRANSCEIVER

RELATED APPLICATIONS

This application is one of a series of related applications assigned to common ownership. Other applications in the series include:

Application Ser. No. 08/781,004 filed 9 Jan. 1997, entitled "Mobile Client Computer with Keyboard Interface" with named inventors T. Aebli, B. Miller and W. W. Vetter;

Application Ser. No. 08/703,171 filed 22 Aug. 1996, entitled "Mobile Client Computer Programmed to Predict Input" with named inventors R. L. Bertram, D. F. Champion and P. Brittenham;

Application Ser. No. 08/708,168 filed 22 Aug. 1996, entitled "Mobile Client Computer Programmed to Exchange Lists of Predicted Input" with named inventors R. L. Bertram and W. T. Oldfield;

Application Ser. No. 08/814,034 filed 10 Mar. 1997, entitled "Mobile Client Computer Interacting with Docking Device" with named inventors E. H. Booth, B. A. Carpenter, R. B. Ferrier, R. A. Resnick and W. W. Vetter;

Application Ser. No. 08/706,990 filed 22 Aug. 1996, entitled "Mobile Client Computer Programmed to Copy Lists of Predicted Input" with named inventors R. L. Bertram, P. J. Brittenham and D. F. Champion;

Application Ser. No. 08/813,148 filed 7 Mar. 1997, entitled "Mobile Client Computer Programmed for Systems Message Display" with named inventors R. L. Bertram and D. F. Champion;

Application Ser. No. 08/813,522 filed 7 Mar. 1997, entitled "Mobile Client Computer Programmed to Process Table Displays" with named inventor R. L. Bertram;

Application Ser. No. 08/807,969 filed 3 Mar. 1997, entitled "Mobile Client Computer Programmed to Combine Cursor, Control and Input Functions" with named inventors P. J. Brittenham and L. D. Comerford;

Application Ser. No. 08/813,527 filed 7 Mar. 1997, entitled "Mobile Client Computer Programmed to Display Drop Down Scrolling Indicator" with named inventors R. L. Bertram and D. F. Champion; and Application Ser. No. 08/813,521 filed 7 Mar. 1997, entitled "Mobile Client Computer Programmed to Hide Empty Table Elements" with named inventor R. L. Bertram.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

SUMMARY OF THE INVENTION

With the foregoing as background, the present invention contemplates a mobile client system in which a tripartite organization is used to facilitate adaptation of the system to alternate or later developed wireless communication technology. In particular, the system of this invention contemplates the provision of an intermediate element, here called a holster, to enable effective cooperation between a computer system and a wireless data transceiver. The transceiver, as here contemplated, will have additional capability beyond simple data exchange, and preferably will be a telephone or have telephone capability.

BRIEF DESCRIPTION OF THE DRAWINGS

Some of the purposes of the invention having been stated, others will appear as the following description proceeds, when taken in connection with the accompanying drawings, in which:

FIG. 10 is an illustration of the display screen of the mobile client of FIG. 2 while driven by the execution of an application program on the mobile client to display certain data.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
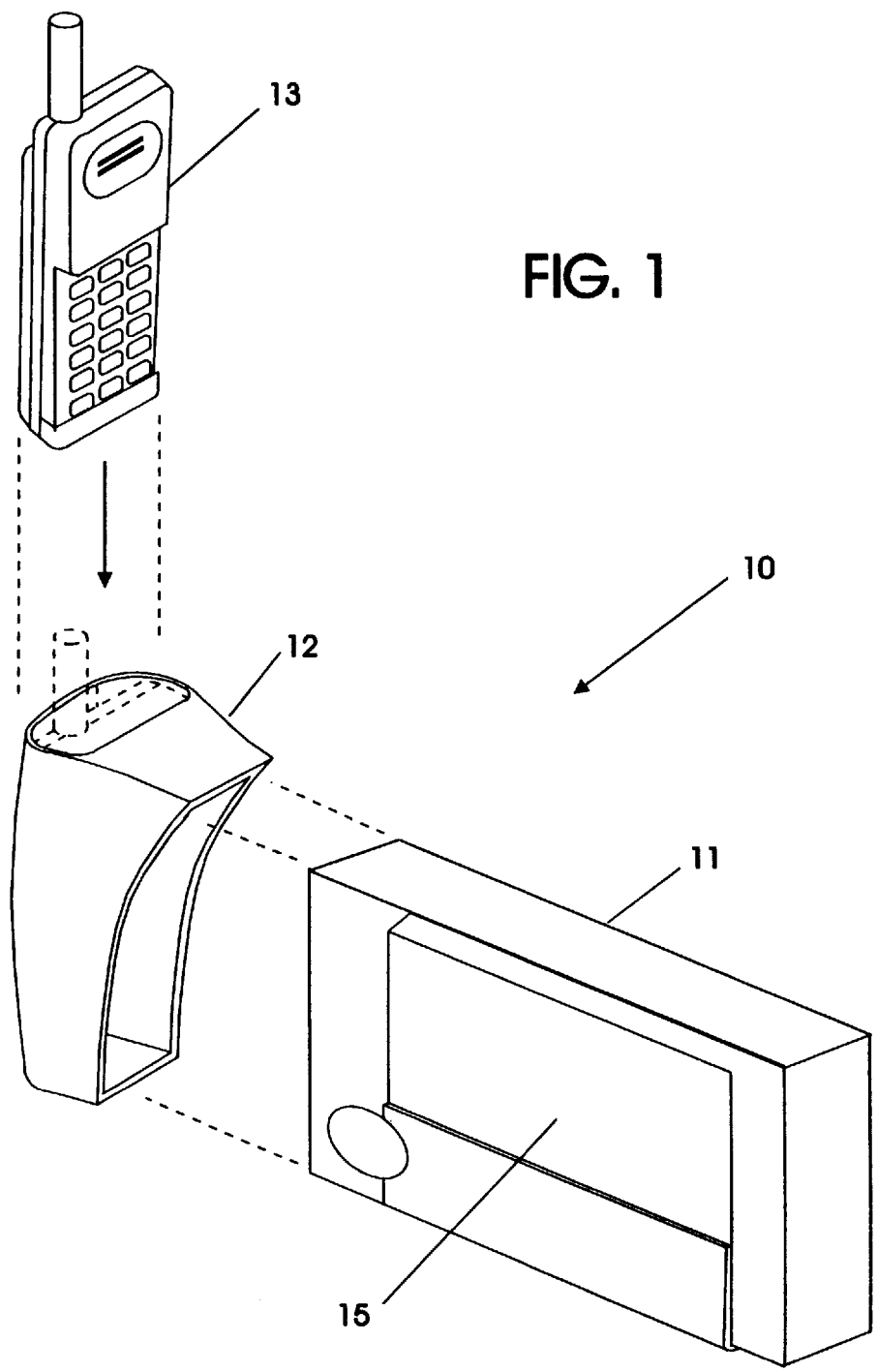
FIG. 1 is an exploded perspective view of certain elements of a mobile client computer system in accordance with this invention.
Figure 2:
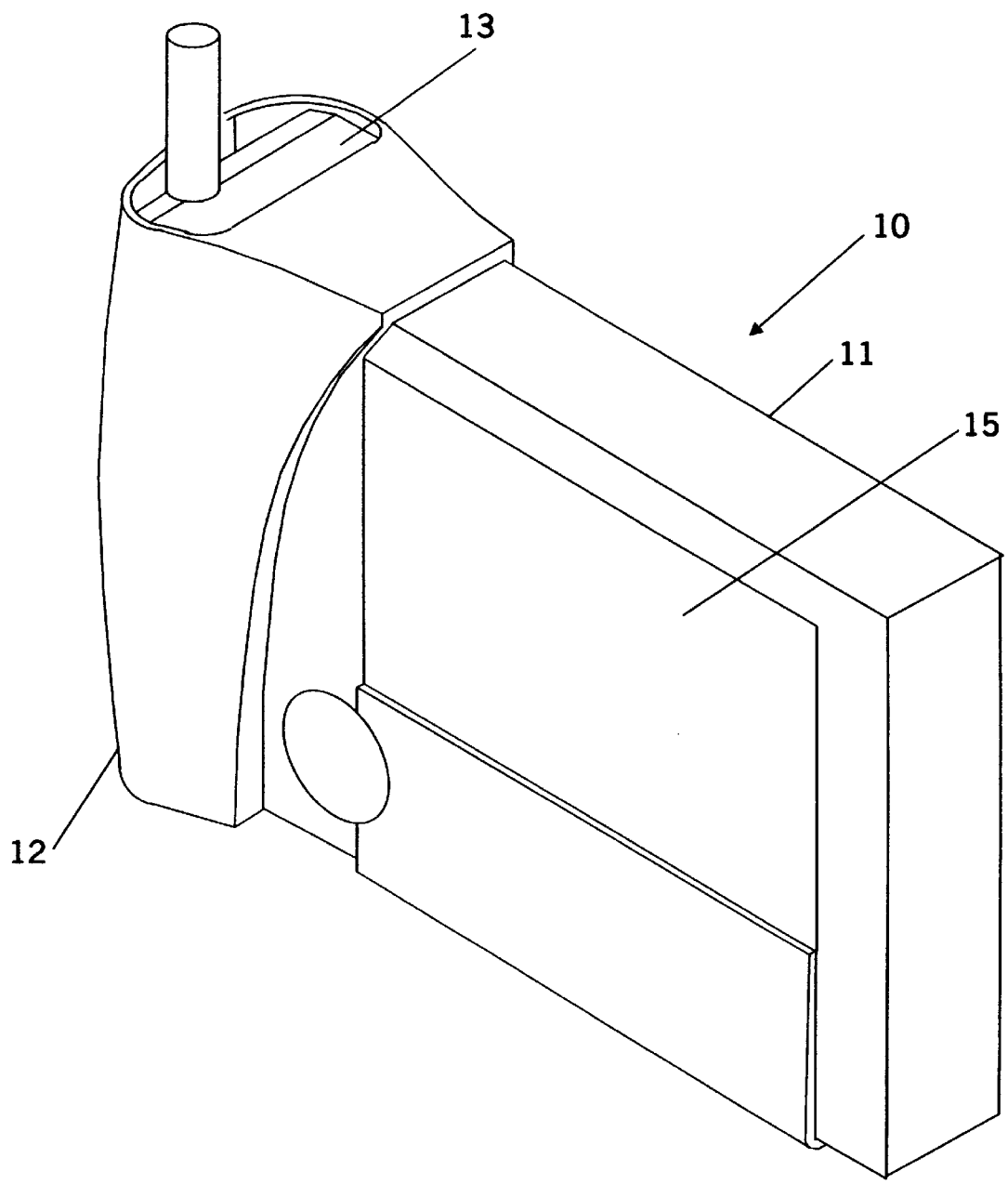
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. Important characterizing features of this invention are to be found in this integration of the tablet 11, holster 12 and transceiver 13, as will be described hereinafter. While thus illustrated and here described as a three component or tripartite system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. While a portion of the description which follows is focussed on an AMPS system, it is to be understood that any such technology is within the contemplation of this invention. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
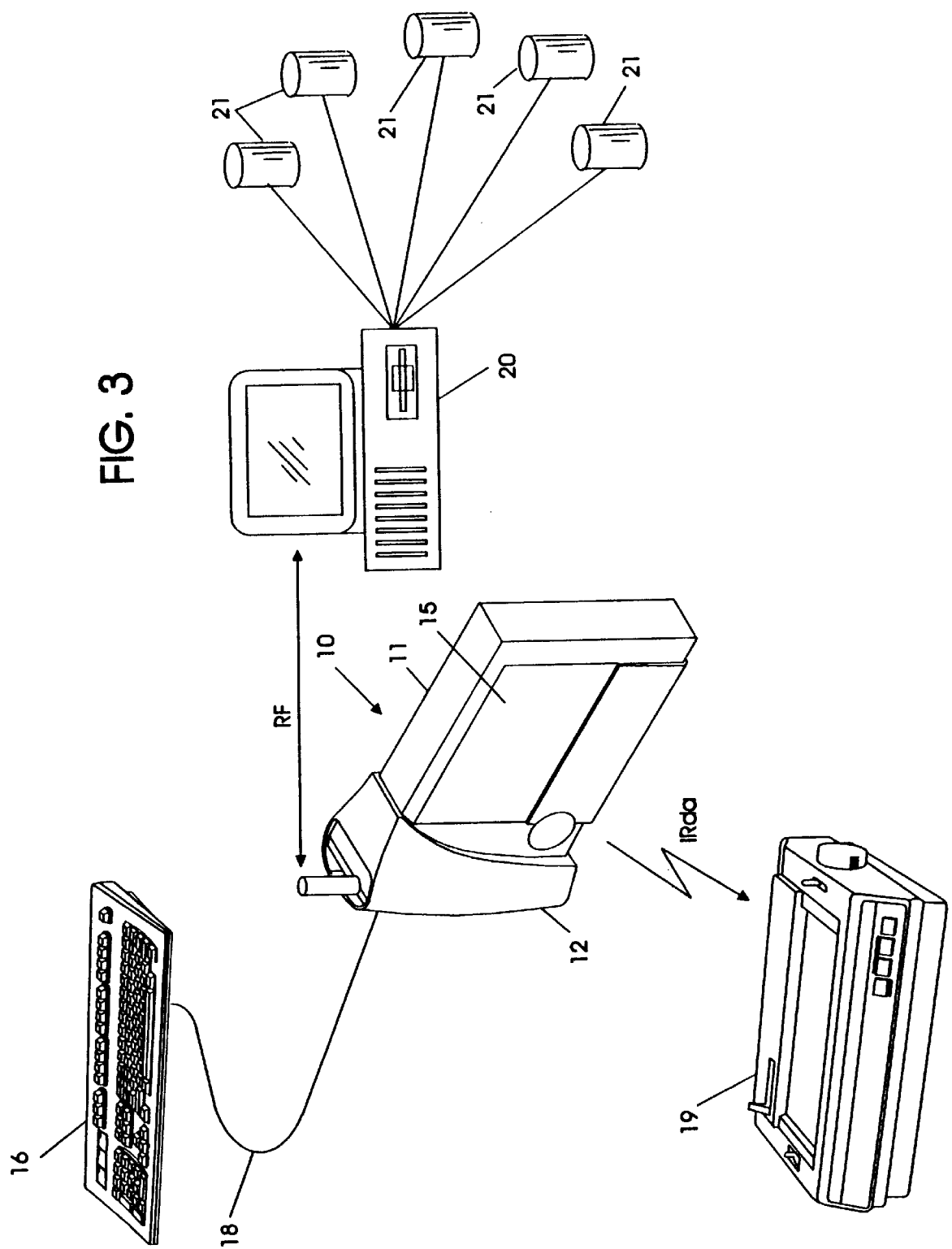
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
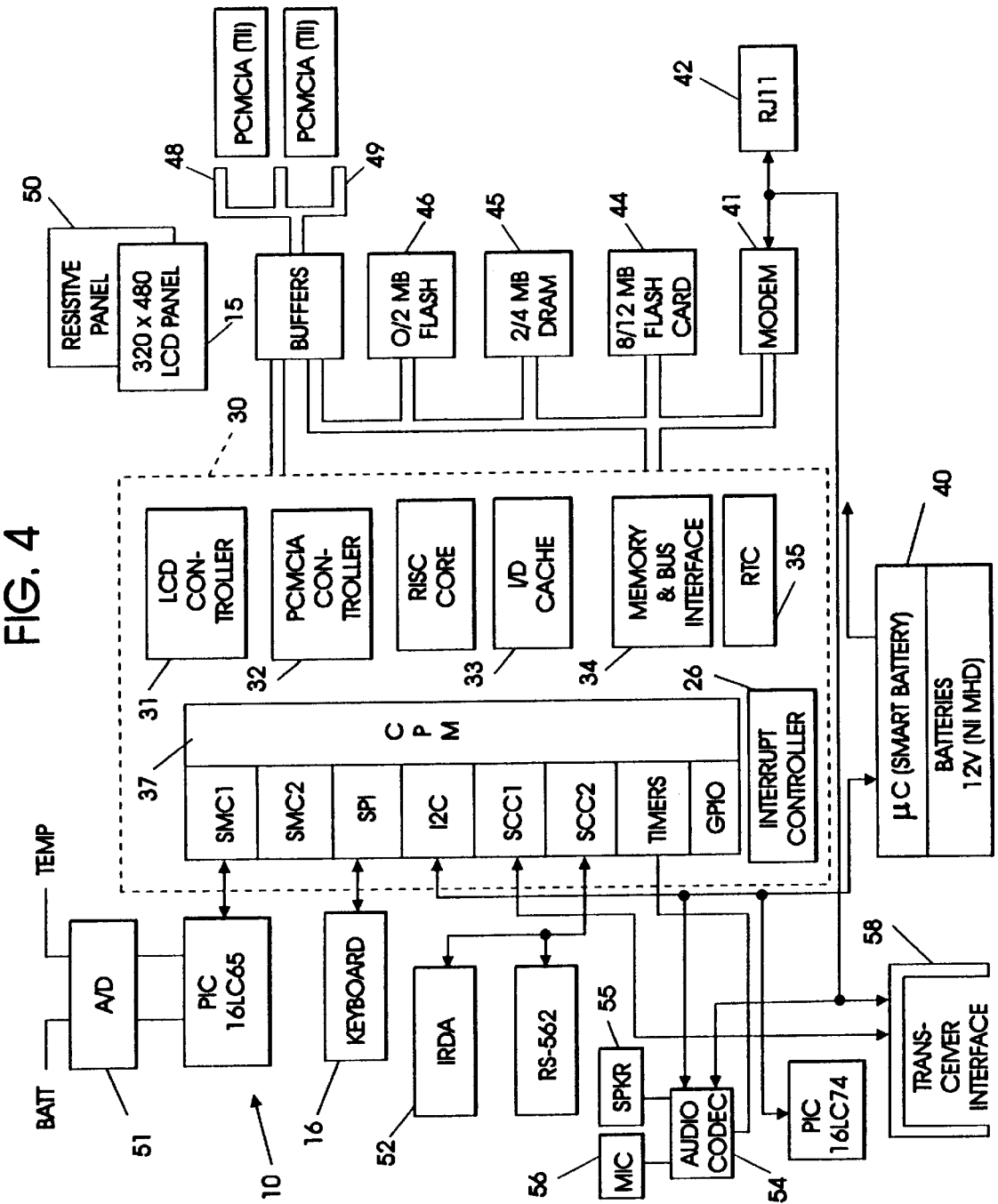
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
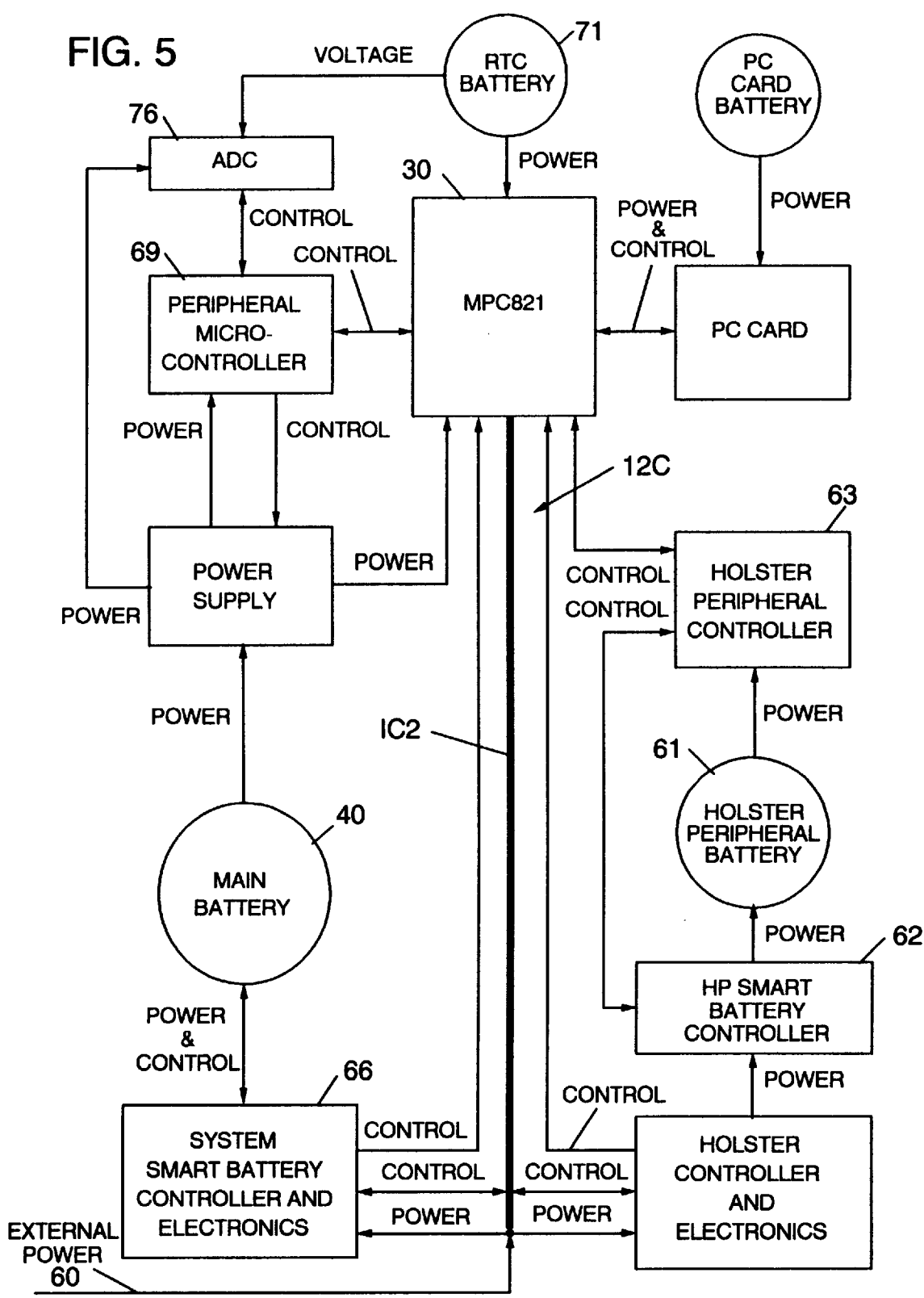
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

The holster 12 is designed as a compatible electrical and mechanical interface between the tablet 11 and a suitable transceiver 13, here illustrated as an Ericsson CT-700 cellular phone. For brevity, the Ericsson cellular phone will simply be referred to hereinafter by its model destination, CT-700. In that context, the CT-700 appears electrically as a standard serial port peripheral, and mechanically as a fully integrated cellular telephone feature of the mobile client system 10. It is to be understood that, while an particular telephone unit is here described as a suitable transceiver, the invention contemplates that any selected one of a number of such transceivers can be used. Indeed, the ready substitution of transceivers is an important characteristic of this invention.

The CT-700 transceiver 13 is integrated with the holster 12 in a manner such that it can be removed and operated separately and independently of the mobile client system. It therefore maintains its identity as a discreet and fully self-contained cellular telephone. Conversely, the holster integration can be easily adapted to a desktop and/or vehicle docking environment which can support external antenna or RF power booster options if desired.

The holster 12 provides control of the holster peripheral 13, including power control and battery charging, which is accomplished by use of the following signals:
 1. A 2-wire Serial Data Interface to the transceiver;
 2. A 2-wire $I^2C$ Port which operates in slave mode only with a seven bit address;
 3. The following discrete signals:
    a. BSTAT (Battery Status)
    b. RI# (Ring Indicate)
    c. PC6 (holster peripheral installed/removed interrupt)
    d. GP_HOL0 (Reserved)
    e. GP_HOL1 (Reserved)
 4. The following power supplies:
    a. VBAT (Battery Bus Voltage)
    b. 5V
    c. 3.3V
    d. 12V if provided for reprogramming of holster peripheral program ROM The holster accommodates charging of the transceiver cellular phone battery while integrated into the holster with any external power adapter attached. These may be an alternating current adapter for the United States or any other country, an automobile adapter, or a desktop or vehicle docking station. The holster design precludes charging the transceiver battery from the tablet battery alone.

The holster 12 sends the proper audio signals to and from the tablet so a voice-enabled radio can perform system voice processing. These signals are also used for data transmission and reception from the main unit modem to the cellular radio. Differential audio is sent to and from the holster. The AMPS holster peripheral or transceiver has a single-ended interface. The holster electronics performs the single-ended to differential conversion, as well as scales the audio values to meet the requirements of both the system and holster peripheral interfaces.

The RF signal from the radio is passed to external docking appliances.

Figure 6:
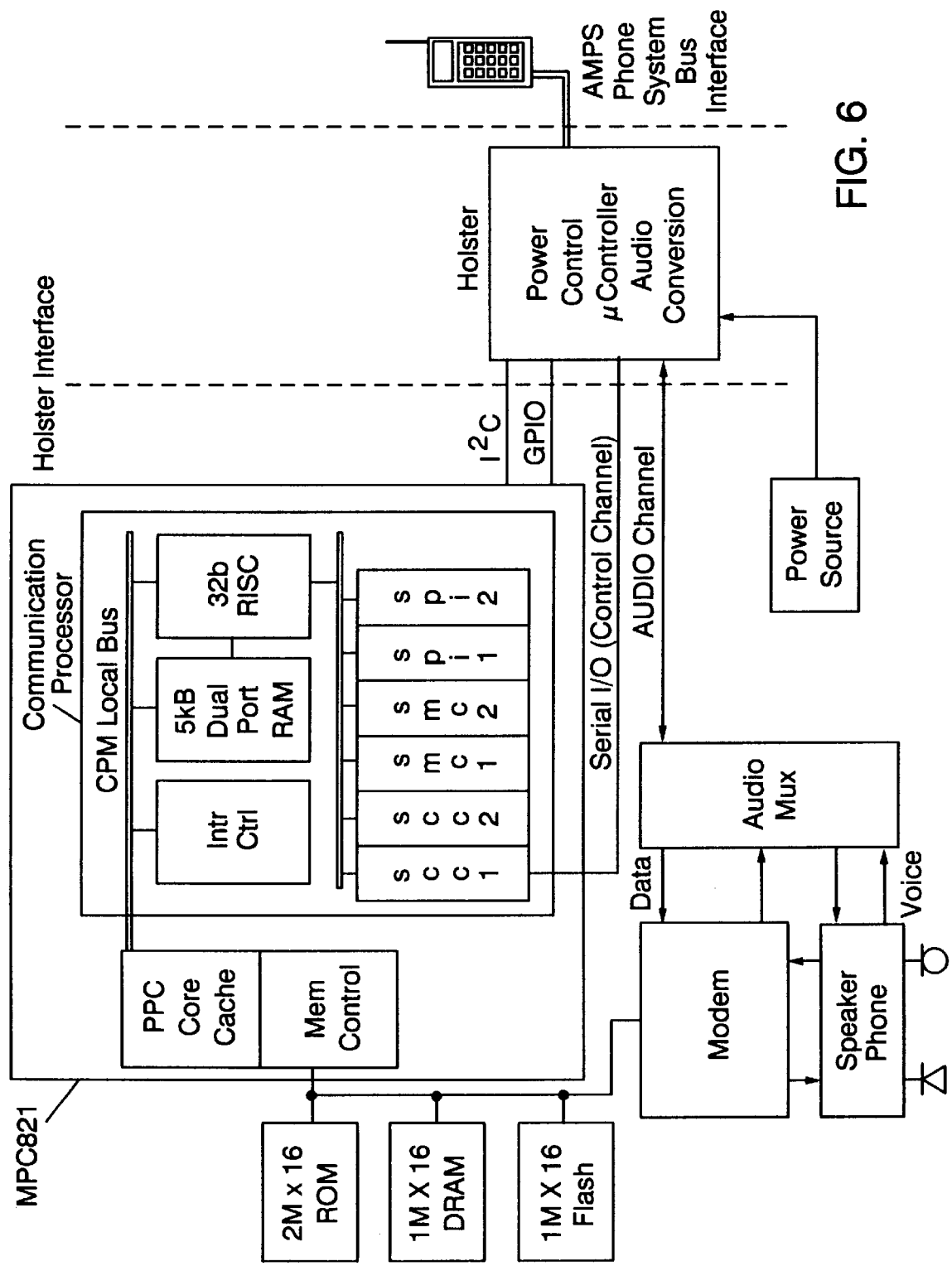
FIG. 6 is a alternate illustration of the relationships among the tripartite elements of a mobile client system as contemplated by this invention.
Figure 7:
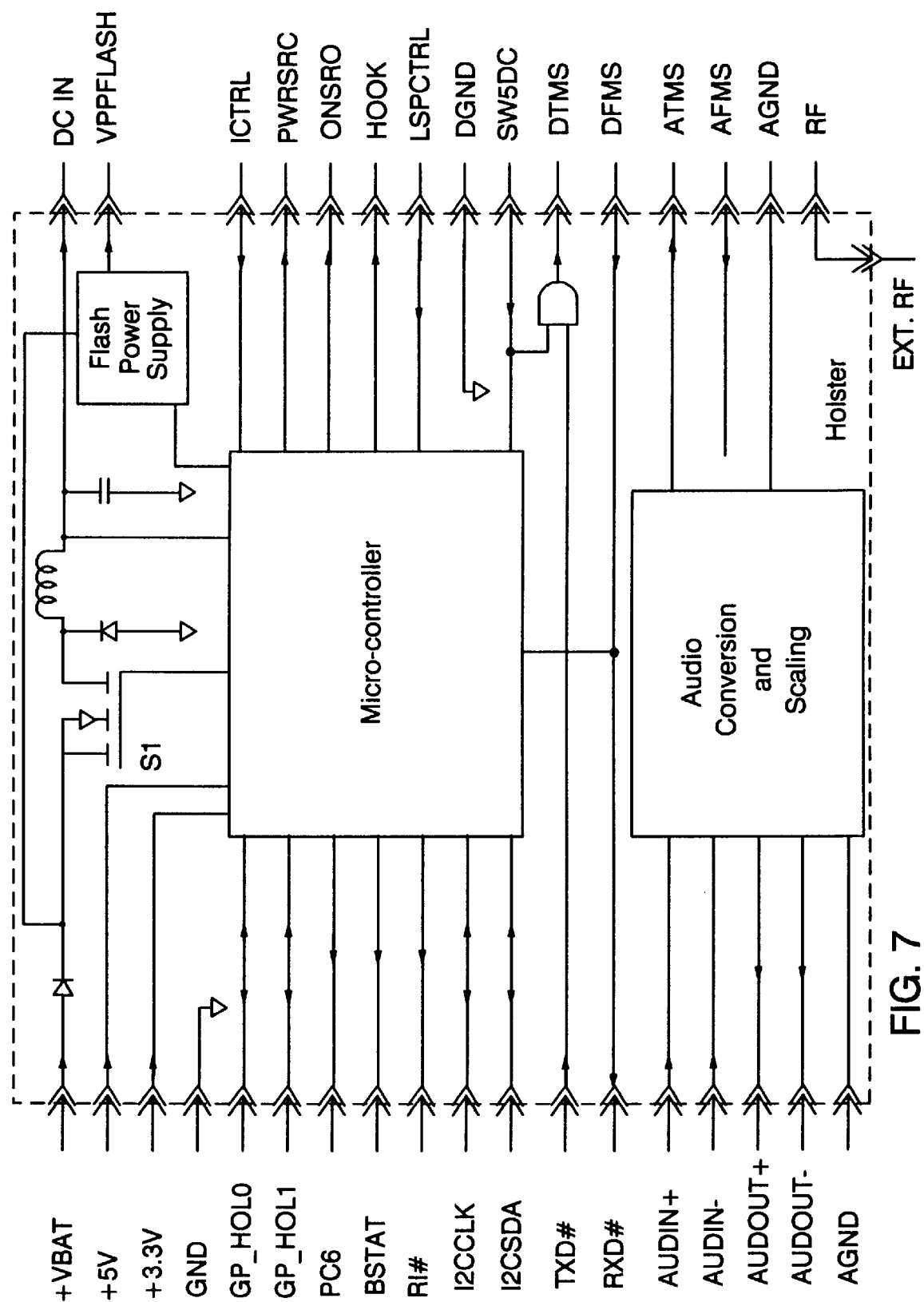
FIG. 7 is a more specific illustration of circuit elements included in a holster element shown in FIGS. 1, 2 and 6;.

FIG. 6 is a high level block diagram of the holster and holster peripheral interface, with more specifics being shown in FIG. 7. As there shown, there are two paths for data communication and one path for audio communication between the tablet 11 and the holster (holster peripheral). One of the data paths is an $I^2C$ bus which interfaces between a Motorola MPC821 RISC processor in the tablet 11 and the holster micro controller, which may be a Micro Chip PIC16C74. The $I^2C$ bus is a simple, 2-way, 2-line, serial communication interface. The two lines are a serial data line, $I^2CSDA$, and a serial clock line, $I^2CCLK$. Commands for functions such as turning the CT-700 on and off, charging the CT-700 battery, and setting the FLASH VPP are handled across the $I^2C$ interface. These $I^2C$ commands cause the levels of certain control signals on the CT-700 system bus interface to be toggled in order to affect the desired function.

The other data path is between the SCC1 Serial port of the MPC821 and the CT-700. This data path consists of two signals, TXD#I and RXD#, which interface to the Data to Mobile Station (DTMS) and Data from Mobile Station (DFMS) pins of the CT-700 system bus interface. This data path permits the tablet to send commands to the phone. The CT-700 system bus is a 14 pin interface located on the bottom side of the phone. The CT-700 functions available through the serial data channel to the tablet are the same functions that the CT-700 software makes available to the user through the CT-700 keyboard and display. Commands that are sent through the DTMS pin are automatically echoed back from the DFMS pin as a response. Responses from the phone are asynchronously spewed from the phone based on a user-initiated event (i.e. power-on/off, dialing, storing/recalling a number/name, etc. . . . ), a response to a command, or a change in any of the fields on the phone display/screen. Complete details on the CT-700 functions and commands are given in Ericsson's Anna Jane User Software Specification RTP-TE 92:014 and System Bus Specification CT/UT 89:010, to which the interested reader is referred. It is to be understood that, in the broader contemplation of this invention, the transceiver 13 can be other than a CT-700. Indeed, and as pointed out herein, the present invention contributes to flexibility in adaptation to holster peripherals of varying types and capabilities.

Because the CT-700 does not provide a ring interrupt signal (RI#) on its system bus interface, there is no direct way to notify the tablet of an incoming call if the CT-700 is in the holster and the ring is muted. The holster PIC16C74 micro controller monitors the DFMS line from the CT-700 and through firmware does parsing of the asynchronous serial command responses. The purpose of doing this parsing is to detect the serial response sequence for an incoming call and activate signal RI# to the tablet.

The audio path is the other important holster interface. The holster electronics performs scaling, filtering, and single ended to differential conversion (SE-DIFF) as required to meet the interface requirements of the system and holster peripheral inter-faces. For an outgoing, analog AMPS cellular voice/data call, differential inputs, AUDIN+ and AUDIN−, are channeled from a tablet internal modem card, converted to a single-ended signal with the proper voltage level, and output to the Audio to Mobile Station (ATMS) pin of the CT-700. Vice versa, on an incoming call, the single-ended Audio from Mobile Station (AFNIS) signal from the CT-700 is converted to a differential pair of signals with the appropriate voltage levels, and output to the moden as AUDOUT+ and AUDOUT−.

Upon occurrence of a holster peripheral wake-up event (such as inserting a peripheral) or system command for holster operation, the holster electronics performs the following functions:
 1. Assert the BSTAT line to alert the status change to the system
 2. Check the battery voltage of the holster peripheral
 3. Report status to the system via the $I^2C$ bus upon system status inquiry
 4. Respond to other system queries and commands as defined hereinafter The power-up state for the holster is:
1. Holster Peripheral OFF
2. Battery Charging OFF
3. Holster Electronics in Standby The holster peripheral charging routine is controlled by the holster peripheral via its ICTRL output. The holster electronics shall provide 700 mA$^+/_-$10% when ICTRL is HIGH, and 30 mA when ICTRL Is LOW. Charging shall occur only when commanded by the tablet. The holster electronics provides maximum voltage limiting protection to the battery. The holster electronics reports charge termination to the system using BSTAT, which is an interrupt from the holster to the tablet. Upon termination of charging, the holster electronics maintains the output voltage at a predetermined level, and the current limit is set to the holster peripheral maximum.

Before discussing the power management capabilities of the mobile client system as described to this point, it is deemed possibly helpful to understanding the interfaces among the tablet, holster and transceiver to set forth some of the signal exchanges in the following table.

| Function | Stimulus | Source | Destination | Response |
| --- | --- | --- | --- | --- |
| Holster/Peripheral status | I²C command | Tablet | Tablet | Return status |
| Initialization | Voltage rise or I²C command | Tablet | Holster peripheral | Initialize to known state; return status |
| Turn transceiver "on" | I²C command | Tablet | Holster peripheral | Set ONSRQ "on"; update status register; return status |
| Turn transceiver "off" | I²C command | Tablet | Holster peripheral | Set ONSRQ "off"; update status register; return status |
| Energize holster peripheral from tablet battery | I²C command | Tablet | Holster peripheral | Read holster peripheral battery voltage; set reference to power supply; turn on power supply; set ONSRQ "on"; update status register; return status |
| Ring indication | "Call" indication over serial channel | Holster peripheral | Tablet | Set RI# low; update status register |
| Inhibit DTMS | 5vSW LOW | Holster peripheral | Holster peripheral | DTMS held low |
| Charge peripheral battery | I²C command | Tablet | Holster peripheral or tablet | Check Vbat > 10Vdc; set ONSRQ "on"; monitor ICTRL and DCIN for termination; update status register; set BSTAT; return charge termination; ELSE: set BSTAT; system checks |
| Peripheral insertion interrupt | Peripheral insertion/extraction | User | Tablet | "externa; power" bit of status register; On insertion: set BSTAT; set PC6 low; update status register On extraction: Set BSTAT; set PC6 high; update status register |

For further help in understanding of this invention, particularly the identification above of certain response as involving interaction with a holster status register, what follows is the definition of the holster status register as used in one operating mobile client system which embodied this invention.

| Bit | "1" (high) definition | "0" (low) definition |
| --- | --- | --- |
| 0 | External power applied | External power removed |
| 1 | Fast charge in progress | Fast charge not in progress |
| 2 | Holster peripheral OUT | Holster peripheral IN |
| 3 | Holster peripheral ON | Holster peripheral OFF |
| 4 | Ring not in progress | Ring in progress |
| 5 | Audio channel obtained | Audio channel not obtained |
| 6 | Hook high | Hook low |
| 7 | Charging overcurrent | Charge current OK |
| 8 | VPPFLASH = 12 V | VPPFLASH not = 12 V |
| 9–14 | Unused | Unused |
| 15 | Holster initialized | Set to "1" after successful initialization |

Figure 8:
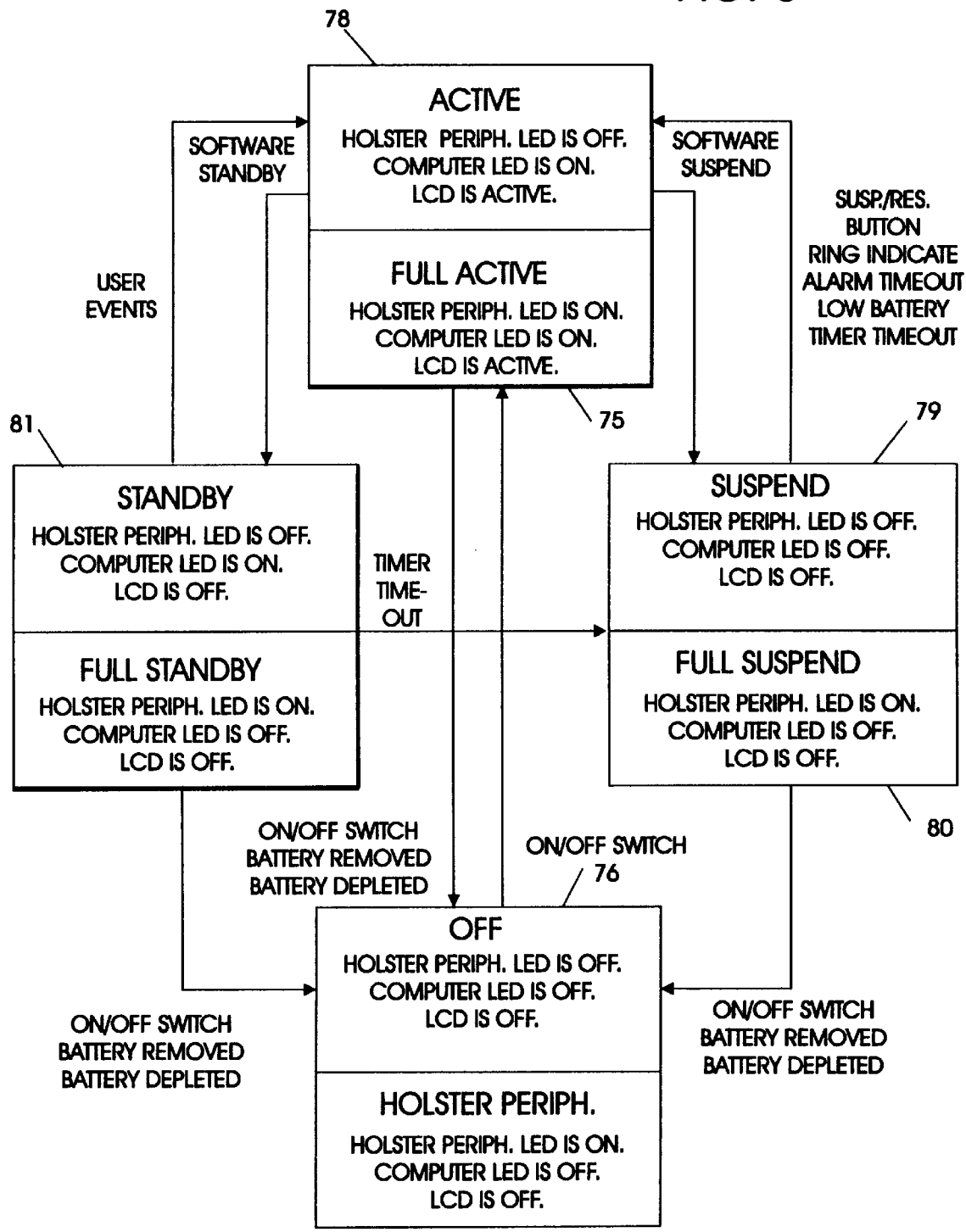
FIG. 8 is a state diagram of power modes for the mobile client of FIG. 2 and transitions among them.

Turning now from the hardware topology to a discussion of the power modes and transition events for the mobile client system 10, FIG. 8 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 8, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 9:
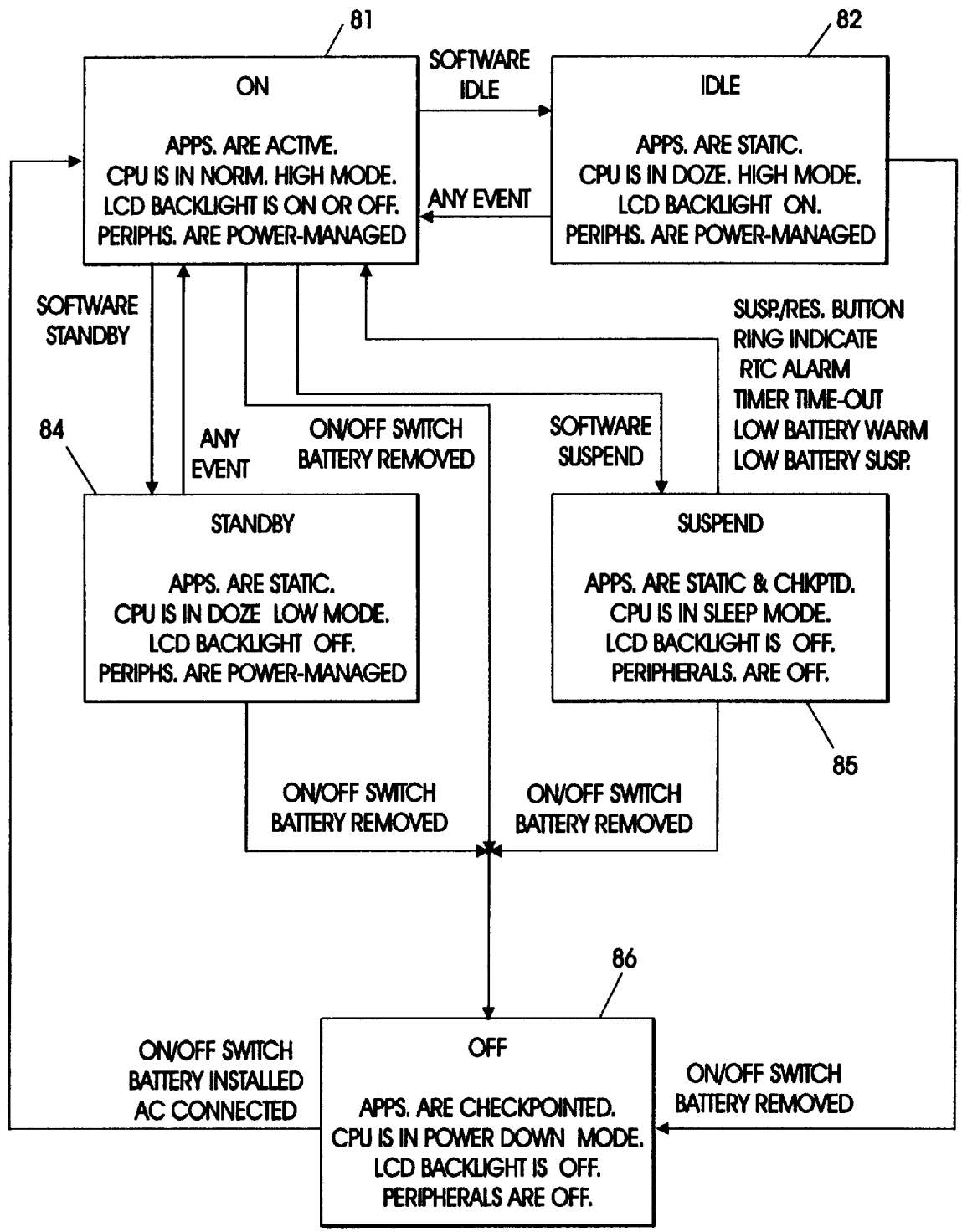
FIG. 9 is a diagram similar to that of FIG. 8 showing the states of certain elements of the mobile client of FIG. 2 and including the status of software executing on the mobile client.

Another view of the power modes and transition events is given in FIG. 9. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

Figure 10:
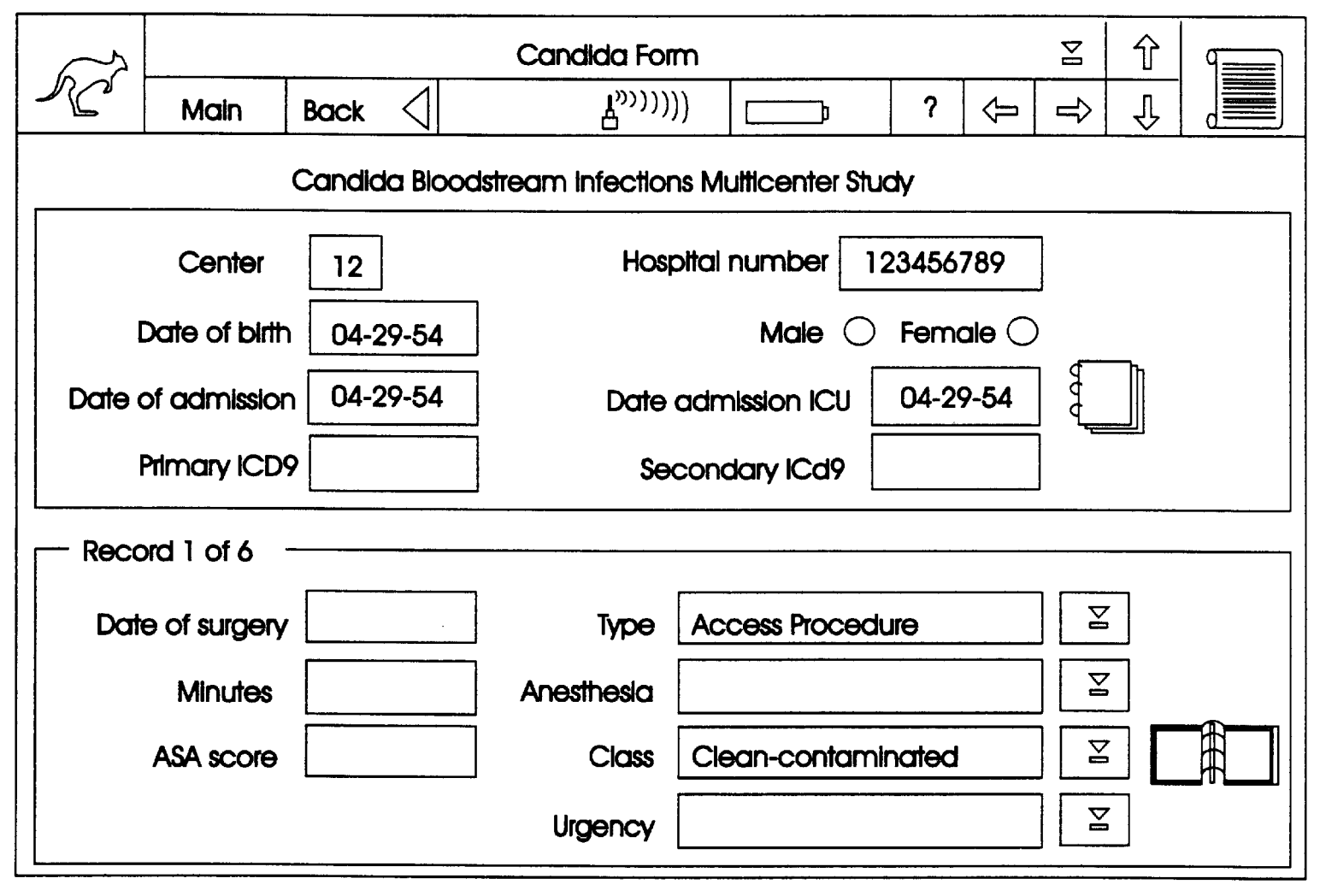

It is now believed instructive to address briefly the display and communication of data as contemplated for the mobile client system of this invention. Referring now more particularly to FIG. 10, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 10. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 10, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer comprising:

a housing sized to be held in and manipulated by the hand of a user;

a processor mounted within said housing and processing digital data;

a memory device mounted within said housing, storing digital data and coupled to said processor;

a display mounted in said housing and coupled to said processor and said memory device to display information derived from digital data processed by said processor;

an input digitizer mounted in said housing and overlaying said display, said digitizer being coupled to said processor and enabling input of digital data by a user;

a radio frequency transceiver exchanging radio frequency signals with a remote system and thereby transferring data between the remote system and said transceiver; and a holster operatively interposed between and connecting said housing and said transceiver, said holster having a microcontroller and a plurality of signal conductors connected with said processor and said transceiver, said microcontroller and said conductors exchanging signals between said processor and said transceiver and thereby transferring data between the remote system and said processor.

2. Apparatus according to claim 1 further comprising a battery mounted within said housing and coupled with said processor and said memory device and supplying electrical current to said processor and memory device for operation thereof, and further wherein said holster comprises power transmission circuits operatively connected with and controlled by said microcontroller to supply electrical current to said transceiver from said battery.

3. Apparatus according to claim 2 wherein said microcontroller monitors voltage available from said battery and responds to a decrease in voltage below a predetermined threshold value by inhibiting transmission of signals to said transceiver.

4. Apparatus according to claim 1 wherein said processor, acting through said microcontroller and said conductors, controls the operative state of said transceiver.

5. Apparatus according to claim 1 wherein said transceiver, acting through said microcontroller and said conductors, signals to said processor the arrival of an incoming call from a remote system.

6. Apparatus according to claim 1 wherein said holster further has a bidirectional audio conversion circuit interposed between said processor and said transceiver and converting audio signals exchanged therebetween to and from single ended and differential formats.

7. Apparatus according to claim 1 wherein said microcontroller and said conductors define a plurality of available data paths between said processor and said transceiver.

8. An assembled mobile client computer system comprising:

a housing sized to be held in and manipulated by the hand of a user;

a processor mounted within said housing and processing digital data;

a memory device mounted within said housing, storing digital data and coupled to said processor;

a display mounted in said housing and coupled to said processor and said memory device to display information derived from digital data processed by said processor;

an input digitizer mounted in said housing and overlaying said display, said digitizer being coupled to said processor and enabling input of digital data by a user;

a radio frequency transceiver exchanging radio frequency signals with a remote system and thereby transferring data between the remote system and said transceiver, said transceiver having telephonic capability for freestanding use; and a holster separable from, and configured to receive, said housing and said transceiver and operatively interposed between and connecting said housing and said transceiver when received, said holster having a microcontroller and a plurality of signal conductors connected with said processor and said transceiver, said microcontroller and said conductors exchanging signals between said processor and said transceiver and thereby transferring data between the remote system and said processor.

9. A system according to claim 8 further comprising a battery mounted within said housing and coupled with said processor and said memory device and supplying electrical current to said processor and memory device for operation thereof, and further wherein said holster comprises power transmission circuits operatively connected with and controlled by said microcontroller to supply electrical current to said transceiver from said battery.

10. A system according to claim 9 wherein said microcontroller monitors voltage available from said battery and responds to a decrease in voltage below a predetermined threshold value by inhibiting transmission of signals to said transceiver.

11. A system according to claim 8 wherein said processor, acting through said microcontroller and said conductors, controls the operative state of said transceiver.

12. A system according to claim 8 wherein said transceiver, acting through said microcontroller and said conductors, signals to said processor the arrival of an incoming call from a remote system.

13. A system according to claim 8 wherein said holster further has a bidirectional audio conversion circuit interposed between said processor and said transceiver and converting audio signals exchanged therebetween to and from single ended and differential formats.

14. A system according to claim 8 wherein said microcontroller and said conductors define a plurality of available data paths between said processor and said transceiver.

15. A computer comprising:

a housing;

a processor mounted within said housing and processing digital data;

a memory device mounted within said housing for storing digital data and coupled to said processor;

a display coupled to said processor and said memory device to display information derived from digital data processed by said processor;

a radio frequency transceiver exchanging radio frequency signals with a remote system and thereby transferring data between the remote system and said transceiver; and a holster operatively interposed between and connecting said housing and said transceiver, said holster having a microcontroller and a plurality of signal conductors connected with said processor and said transceiver, said microcontroller and said conductors exchanging signals between said processor and said transceiver and thereby transferring data between the remote system and said processor.

16. A computer according to claim 15 further comprising a battery mounted within said housing and coupled with said processor and said memory device and supplying electrical current to said processor and memory device for operation thereof, and further wherein said holster comprises power transmission circuits operatively connected with and controlled by said microcontroller to supply electrical current to said transceiver from said battery.

17. A computer according to claim 16 wherein said microcontroller monitors voltage available from said battery and responds to a decrease in voltage below a predetermined threshold value by inhibiting transmission of signals to said transceiver.

18. A computer according to claim 15 wherein said processor, acting through said microcontroller and said conductors, controls the operative state of said transceiver.

19. A computer according to claim 15 wherein said transceiver, acting through said microcontroller and said conductors, signals to said processor the arrival of an incoming call from a remote system.

20. A computer according to claim 15 wherein said holster further has a bidirectional audio conversion circuit interposed between said processor and said transceiver and converting audio signals exchanged therebetween to and from single ended and differential formats.

21. A computer according to claim 15 wherein said microcontroller and said conductors define a plurality of available data paths between said processor and said transceiver.

* * * * *